June 24, 1969 R. H. WEICHSEL 3,451,731

THRUST BEARING

Filed March 9, 1967

INVENTOR.
Richard H. Weichsel
BY John Mahoney
attorney 3,451,731
THRUST BEARING
Richard H. Weichsel, Hudson, Ohio, assignor to The Apex Bearings Company, a corporation of Ohio
Filed Mar. 9, 1967, Ser. No. 623,506
Int. Cl. F16c 7/04, 35/00, 1/24
U.S. Cl. 308—9     6 Claims

ABSTRACT OF THE DISCLOSURE

A hub having grooves and channels and a peripheral recess in its upper portion, a porous disc having its outer edge seated in said recess, said disc being composed of copper spheres of approximately 100 mesh and tin particles of approximately 200 mesh pressed together and heated at a temperature of approximately 1535° F. to sinter the tin and cause it to encapsulate the copper spheres to form a myraid of venturi-shaped pores, a work bench rotatable on the disc, and means for forcing a gas into said grooves and channels and thence through the venturi-shaped pores in said disc to form a thin gas film between the disc and work bench. The thickness of the disc is that required to support the static or at rest load of the work bench and the width of the grooves and channels are substantially the same as the thickness of the disc and the depth of the grooves and channels are approximately one-half of the thickness of the disc. Means are also provided to reverse the flow of the gas through the disc to maintain the work bench in a fixed position.

---

The present invention relates to bearings and more particularly to thrust bearings of the flat disc type through which a gas, such as air, engine exhaust gases, or the like, may be passed to form a thin uniform gas bearing for a rotatable object, such as a work bench or table.

To provide gas bearings, it has heretofore been proposed to utilize a bearing having multiple holes leading to the gas film. In such bearings, however, the restriction varies with the thickness of the film and it is difficult to obtain a substantially uniform load supporting film. It has also been proposed to use mechanically-formed porous type bearings. In porous type bearings, the air restriction occurs ahead of the port of entry of the gas into the film so that restriction does not vary with the thickness of the film as in the case of multiple hole bearings and consequently the bearing can be more easily loaded than with multiple hole feed bearings. In mechanically-formed porous type bearings as previously provided, however, considerable turbulance occurs in the film and it is difficult to provide a substantially uniform gas bearing for a rotatable member, such as a bench or work table.

It is an object of the present invention to provide a bearing including a hub for supporting a porous disc, a rotatable bench or work table mounted on the porous disc, and means for passing a gas through the porous disc to provide a uniform, nonturbulent gas film between the porous disc and the work table.

Another object of the invention is to provide means in combination with a porous disc through which a gas, such as air, may be forced to form a substantially uniform film bearing between the disc and a rotatable object, such as a work bench or table, and in which means are provided whereby the flow of gas may be reversed to maintain the work table in a fixed stationary position.

My invention will be better understood by reference to the accompanying drawings in which.

Figure 1:
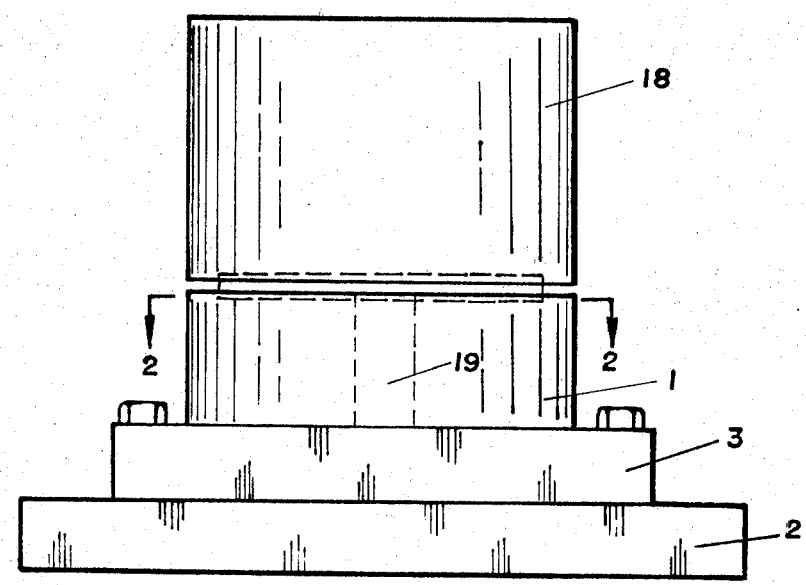
FIG. 1 is an elevational view of a housing showing a workbench or table supported thereon.
Figure 2:
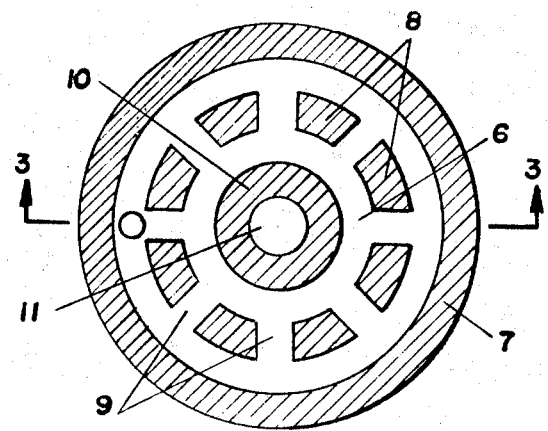
FIG. 2 is a cross sectional view on a plane passing through the line 2—2 of FIG. 1.

In preparing the bearing of the present invention, a hub 1 is provided that may be supported upon a foundation 2 in any suitable manner. As shown, the hub is round and is provided with an enlarged cylindrical base portion 3 having openings therein to receive screws 4 which may be threatened into the foundations 2 which may be the bed way of a machine tool.

In preparing the improved bearing, a cavity is trappaned in the upper portion of hub 1, the outer periphery of which may be machined to the desired size. The hub may consist of a suitable machineable metal such as aluminum, steel, or bronze. A series of grooves may then be machined in the cavity of the hub which may then be deburred. As shown, two grooves 5 and 6 are machined within the cavity of the hub, groove 5 being defined by the outer periphery 7 of hub 1 and a series of lands 8 which are separated from each other by channels 9 and groove 6 being defined by lands 8 and an inner circular hub 10 surrounding the upper portion of a bore 11 in the hub within which a shaft depending downwardly from the work bench or table may be rotated.

Figure 3:
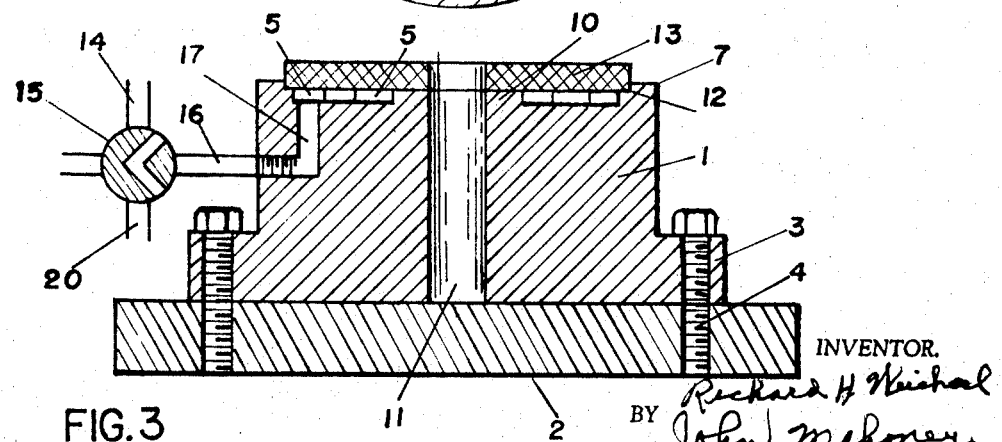
FIG. 3 is a cross sectional view taken on a plane passing through the line 3—3 of FIG. 2, showing a porous disc in place in the housing.

As shown in FIG. 3, the inner periphery of flange 7 is offset as indicated by the numeral 12 to provide an annular seat for a porous disc 13 which also rests upon lands 8 and hub 10.

While the disc 13 may be formed of any suitable porous material affording sufficient feed therethrough to provide and sustain a thin uniform film between the disc 13 and the rotatable bench or work table under load, it is preferably composed of a commercially available material, such as "Oilite" which consist of a body composed of small copper spheres of approximately 100 mesh and substantially uniform size which are encapsulated with sintered tin particles. In preparing the disc, a mixture of copper particles of approximately 100 mesh and tin particles of approximately 200 mesh, both of which are substantially spherical in shape, are first pressed together to form a unitary structure to which sufficient heat is applied to sinter the tin. For this purpose, a temperature of approximately 1535° Fahrenheit is required. The temperature, however, should not be sufficient to liquafy the copper. The copper particles therefore retain their spherical shape and are encapsulated with sintered tin particles to provide myriads of venturi-shaped pores in which the gas meets its maximum resistance as evidence by a substantial pressure drop. The gas then expands and passes outwardly through the porous sleeve to form a thin nonturbulent gas film which lies in close proximity to the outside diameter of the porous disc.

In preparing the disc 13, the small copper spheres preferably constitute the major proportion of the disc and while I do not desire to be limited to any particular proportions, the copper is preferably present in a major amount, such as in amounts ranging from approximately 60% to 90% of the disc in which case the tin is present in proportions ranging from approximately 10% to 40%. The disc may, for example, be composed of approximately 90% of copper spheres and 10% of sintered tin.

To properly supply the porous disc 13 with a sufficient amount of gas, the construction should be of a nature to allow the pressure head to be uniform at the working surface. To obtain this uniform head, the thickness of the disc should be in keeping with that which is required to support the static or at rest load of the bench or work table. Having thus established the thickness of the porous disc 13, this linear measurement should constitute approximately the width of channels 9 and grooves 5 and 6. In such case, the depth of grooves 5 and 6 and channels 8 should be approximately ½ of their width. With such an arrangement, a gas, such as air flowing from groove 5 and channels 9 into groove 6 is first restricted by the venturi-shaped pores in disc 13 and then expands to form a nonturbulent uniform film between the disc 13 and the rotatable work bench or table.

The manner in which the gas, such as air, is forced into contact with disc 13 is also important. As shown in FIG. 3, a conduit means 14 is provided through which a gas may be passed under pressure through a normally open valve 15 to the pipe 16 which as shown may be threaded into a tapped opening in hub 1 which communicates with a conduit means 17. Conduit means 17, in turn, is connected to groove 5. It will be noted that channels 9 lead from groove 5 to groove 6 so that a gas, such as air, passing through the grooves 5 and 6 makes contact with and passes through disc 13 over a comparatively large area. Because of the restriction to air passing through the venturi-shaped pores in disc 13, however, a comparatively thin uniform film is formed between the porous disc 13 and the bottom of a rotatable work bench which lies in close proximity to disc 13.

The work bench which is designated by the numeral 18 may be provided with a depending shaft 19 which passes through an aperture in disc 13 and which fits in bore 11 and when a gas, such as air, is passed through conduit means 14, valve 15, pipe 16, and conduit means 17 to groove 5 and through channels 9 to groove 6, it passes through porous disc 13 to form a thin air film between the disc 13 and the work bench. Because such a lubricating air film has a much lower resistance than oil, the bench 18 may be easily rotated in either direction to a desired position. For maintaining the work bench in a stationary position, valve 15 may be rotated to such a position that a conduit means 20 leading to a suitable vacuum source is connected to pipe 16, conduit means 17, grooves 5 and 6 and channels 9 to draw air through the porous disc 13.

What I claim is:

1. A bearing including a hub having a cavity therein, means providing a plurality of circular grooves and interconnecting channels in said cavity and including lands integral with said hub for separating said grooves and channels from each other, a porous disc resting on said lands and covering said grooves and channels, portions of which disc are in direct contact with a gas passing through said grooves and channels, a rotatable work bench, and means for forcing a gas through said grooves and channels and said porous disc to form a thin uniform gas bearing between said disc and work bench.

2. A bearing as defined in claim 1 in which the hub includes a peripheral flange surrounding said cavity which flange has an offset recess in its inner wall upon which the outer periphery of said disc rests.

3. A bearing as defined in claim 2 in which said hub has a central bore therein and said work bench has a depending shaft rotatable in the bore of said hub.

4. A bearing as defined in claim 1 including means for discontinuing the passage of gas through said porous disc and means whereby a vacuum may be applied to draw air in a reverse direction through said disc and said grooves and channels and outwardly from said hub to maintain said work bench in a fixed position.

5. A bearing as defined in claim 1 in which said disc has venturi-shaped openings therein for restricting the flow of gas through the disc and is of sufficient thickness to support the static load of said work bench when the work bench is at rest and said grooves and channels being of approximately the same width as the thickness of said disc.

6. A bearing as defined in claim 1 in which said disc is of sufficient thickness to support the static load of said work bench when the work bench is at rest and said grooves and channels being approximately the same width as the thickness of said disc and each groove and channel having a depth which is approximately one-half the thickness of said disc.

References Cited

UNITED STATES PATENTS

| | | | |
|---|---|---|---|
| 3,044,836 | 7/1962 | Conlon | 308—9 |
| 3,103,364 | 9/1963 | Macks et al. | 274—39 |

CARROLL B. DORITY, JR., *Primary Examiner*

U.S. Cl. X.R.

308—170